United States Patent [19]
Dulaney et al.

[11] 3,856,213
[45] Dec. 24, 1974

[54] METHOD OF PRODUCING KAOLIN CLAY FROM ORE HAVING SILICA SAND CONTENT

[75] Inventors: Lucius B. Dulaney, Houston, Tex.; Erwin F. Theobold, Sutter Creek, Calif.

[73] Assignee: Kaolin Corporation, Sutter Creek, Calif.

[22] Filed: Apr. 12, 1973

[21] Appl. No.: 350,399

[52] U.S. Cl. .......................... 241/4, 241/21, 241/23, 241/24
[51] Int. Cl. ............................................ B02c 21/00
[58] Field of Search ............... 241/4, 15, 16, 17, 20, 241/21, 22, 23, 24; 264/DIG. 39

[56] References Cited
UNITED STATES PATENTS

| | | | |
|---|---|---|---|
| 2,693,018 | 11/1954 | Czarnecki | 264/DIG. 39 |
| 2,904,267 | 9/1959 | Lyons | 241/26 |
| 3,075,710 | 1/1963 | Feld et al. | 241/22 X |

*Primary Examiner*—Granville Y. Custer, Jr.
*Attorney, Agent, or Firm*—Jack W. Hayden

[57] ABSTRACT

Kaolin clay is produced from ore having silica sand content in quantities that inhibit air separation of the silica sand from the kaolin clay by subjecting a slurry of the ore to agitation so that the silica sand acts to reduce or smear the kaolin clay to substantially natural particle size. This slurry is then subjected to rotation so that the heavier silica sand drops from the ore slurry and may be separated from the kaolin clay and then the kaolin clay slurry is thickened to remove some of the water content therefrom and thereafter sprayed into a heated atmosphere not in excess of approximately 1,100°F. to dry the kaolin clay particles.

3 Claims, 1 Drawing Figure

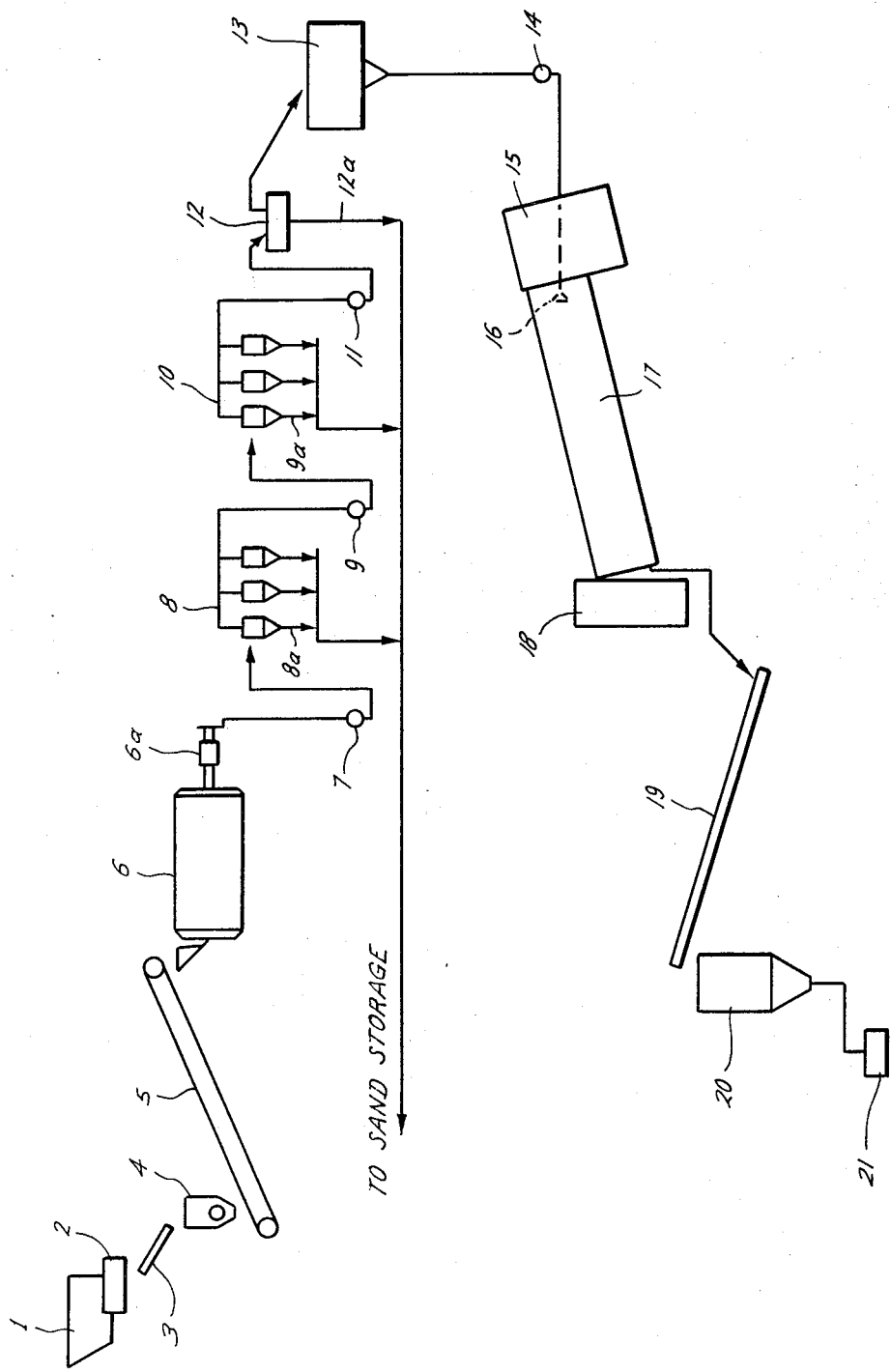

3,856,213

METHOD OF PRODUCING KAOLIN CLAY FROM ORE HAVING SILICA SAND CONTENT

SUMMARY OF THE INVENTION

In those situations where the silica sand content of kaolin clay ore is not excessive, it has been customary to separate the kaolin clay and the silica sand by air separation before the kaolin clay is subjected to other refining and production steps. However, heretofore, no substantially inexpensive and satisfactory method has been proposed for separating kaolin clay from an ore having a silica sand content in quantities that inhibit or substantially prevent air separation of the silica sand and the kaolin clay.

By way of example, where the silica sand content approaches 50 percent by volume in the ore from which kaolin clay is to be recovered, air separation of the sand from the clay is substantially impossible under present circumstances. Quite likely, the volume of sand present which renders it substantially impossible to separate by air may be much less, that is, as low as 10 percent; however, regardless of the exact percentage, by volume, of sand which renders its separation by air impractical, the present invention may be employed.

Thus, the present invention can be employed by adding silica sand to the ore so that the sand is utilized as a reducing agent to break down the kaolin clay to the particle size normally present in the ore.

An object, therefore, of the present invention is to provide a method of producing kaolin clay from ore having a silica sand content in quantities that inhibit air separation of the silica sand from the kaolin clay.

Still another object of the present invention is to recover kaolin clay from an ore having sand content which inhibits separation of the silica sand from the ore by air separation by placing the ore in a water slurry, rotating or agitating the slurry so that the sand acts as a medium to smear or reduce the kaolin clay particles in the slurry to a substantially more natural or normal particle size and then separating the silica sand from the ore slurry by rotating the slurry so that the silica sand discharges downwardly from the ore slurry.

Yet another object of the present invention is to recover kaolin clay from a raw ore having a sand content which inhibits separation of the silica sand from the ore by air separation by placing the ore in a water slurry, rotating or agitating the slurry so that the sand acts as a medium to reduce the kaolin clay particles in the slurry to substantially normal particle size occurring in the raw ore and then separating the silica sand from the ore slurry by rotating the slurry so that the silica sand discharges downwardly from the ore slurry and then thickening the separated kaolin clay slurry, and then spraying the thickened kaolin clay into a heated atmosphere not in excess of approximately 1100°F. to dry the kaolin clay recovered from the ore.

Another object of the invention is to provide a method of recovering kaolin clay from an ore comprising kaolin clay and silica sand and wherein the silica sand content of the ore is at least 50 percent by volume.

Other objects and advantages of the present invention will become apparent from the following description and drawing.

BRIEF DESCRIPTION OF THE DRAWING

The single FIGURE is a schematic flow sheet of the process of the present invention.

DESCRIPTION OF THE PREFERRED EMBODIMENT

Attention is directed to the drawing wherein an ore bin is represented by the numeral 1 which is adapted to receive the ore having the silica sand therein. The configuration of the ore bin is not critical nor is the structural arrangement of the feeder represented by the numeral 2 which is of any suitable form for receiving a charge of ore from the ore bin 1 and placing it on a vibrating screen represented by the numeral 3. The vibrating screen is of well known construction and is provided for eliminating foreign objects and debris from the ore.

From the vibrating screen 3 the ore is discharged into a pug mill 4 where the ore feed is agitated and slurried with water to a desired density for the agitating device represented at 6. Actually, the device 6 in one form is a ball mill wherein the balls have been removed.

Any suitable means may be employed for conveying the ore slurry from the pug mill 4 to the device 6, such conveyor being represented by the numeral 5.

The device 6 may be moved or rotated by any suitable mechanism such as a motor 6a which is connected to rotate the cylindrical grinder 6, whereupon the silica sand in the ore slurry serves as an agent to smear or reduce the kaolin clay and to break it up to substantially the natural individual particle size present in the ore.

At this point of the process, it can be appreciated that the silica sand and other impurities of the ore have not been separated.

After the ore has been subjected to the so-called smearing or reducing action in device 6 a suitable length of time, say for thirty minutes to 2 hours, it is discharged therefrom by the pump 7 into a first bank of tangential separators represented by the numeral 8. The tangential separators are of a well known construction and the liquid slurry is discharged thereinto at any suitable pressure and preferably at a pressure approximating 85 pounds p.s.i. gage so that the heavier silica sand particles are discharged outwardly from the center of the separators and fall downwardly as represented at 8a from each of the separators in the bank of separators 8, with the slurry of lighter kaolin clay particles moving toward the center of the tangential separators, whereupon they are discharged therefrom by means of the pump 9.

Pump 9 then conveys the separated kaolin clay slurry through suitable conduit means to a secondary bank of tangential separators represented by the numeral 10 so that further separation of silica sand occurs and is discharged downwardly therefrom as represented at 9a with the kaolin clay slurry being picked up by the pump 11 at the center of the separator and discharged to a third bank of tangential horizontal separators represented by the numeral 12. Again the heavier silica sand in the slurry is discharged downwardly as represented at 12a, with the discharges 8a, 9a and 12a moving into a common conduit or manifold represented at 12b for discharge to a sand storage.

From the third bank of separators 12, the kaolin clay slurry may be, if desired, conducted to a thickener 13 which may be of any suitable type which is provided with relatively slow moving stirring means to maintain the slurry in suspension on one hand, while permitting the slurry to thicken by evaporation. Of course, additional heat may be supplied if desired. Under some circumstances it may be desirable to discharge the kaolin clay slurry from the separator directly to a drier.

After the slurry has remained in the thickener a desired length of time, which may be any amount of time desired, the thickened kaolin clay slurry is conducted from the thickener 13 by the pump 14 to the rotary kiln represented by the numeral 17.

The thickened slurry is discharged from the pump 14 to a drier for drying of the kaolin clay particles.

One form of drying means may comprise a rotary kiln drier 17. The kaolin clay is conducted to the kiln by any suitable means such as a pump 14 and discharged into the kiln 17 through spray nozzles represented at 16 mounted in the rotary kiln dryer 17, such spray nozzles having orifices of a suitable size to discharge the desired volume of kaolin clay slurry into the rotary drier or kiln 16 in accordance with the design capacity of the system. Also, preferably, the spray nozzles 16 are such that they discharge in a spread of approximately 90° so as to avoid impinging the kaolin clay slurry onto the walls of the rotary kiln before they are dry, or substantially dry.

The rotary kiln may be of usual configuration and a suitable source of heat is illustrated at 15 and having fan means 18 employed therewith to discharge heated air into the rotary kiln and flow such air longitudinally through the rotary kiln in the same direction of flow of the spray discharge from the nozzles 16.

The rotary kiln may be in some instances eliminated and a large spherical vessel employed into which the thickened slurry is discharged by spray nozzles 16. In such event, it may be that the heated air would be in a direction opposite to the flow from the spray nozzles to accomplish the drying of the kaolin clay slurry without impinging the slurry against the walls of the vessel.

The kaolin clay slurry preferably is dried in a manner to avoid calcining thereof and without affecting the color of the kaolin clay particles when dry.

Where the type drier is such that the slurry is subjected to a drying action for about 20 to approximately 30 seconds, the heating temperature may be approximately 1,100°F., and preferably not in excess thereof to inhibit calcining and color change in the resulting product.

Where drying time is longer, that is, approximating 15 to 20 minutes, then the heating temperature should not exceed about 500°F. to inhibit calcining and color change in the resulting product.

In some instances, it may be desirable to dispense with the drying of the thickened slurry and ship it in bulk for use in industry.

The resulting product from the rotary kiln 17 or other drier will normally pass screen size of −5 microns but will not pass screen size of −2 microns, which is generally the desirable size for industry.

For example, to explain the foregoing statement:
100 percent of the resulting dried product passes 400 mesh screen;
90 percent of that which passes 400 mesh screen is less than 10 microns;
55 percent of that which passes 400 mesh screen is less than 5 microns;
25 percent of that which passes 400 mesh screen is less than 2 microns.

A suitable conveyor as at 19 may be employed where the slurry is dried to convey the dried kaolin clay to a storage bin 20, for discharge into a bagger 21.

In the present invention, it can be appreciated that the silica sand is used as an abrasive for breaking up the kaolin clay particles to substantially the particle size occurring in the raw ore and that thereafter the silica sand is separated from the kaolin clay slurry in the manner herein described. The cost of installation of equipment for the process of the present invention is less than other methods, and the maintenance is extremely simple. The end product of the resulting process is dry, easy to handle, load, ship, unload, and involves less waste in dust particles.

Where it is desired to utilize the present process, in some situations sand may be added to the process to act as an agent to smear or reduce the kaolin clay to a desired particle size. For example, silica sand may be added so that its content is preferably from about 40 percent to about 60 percent by volume of the ore in those situations where the silica sand content of the ore is not sufficient to accomplish the results of the present invention. The sand after recovery may be reused in the process.

It can be also appreciated that any suitable means may be employed to separate the kaolin clay particles from the sand, after the kaolin clay particles have been reduced to their particle size approaching that in the raw ore.

The foregoing disclosure and description of the invention are illustrative and explanatory thereof, and various changes in the size, shape, and materials as well as in the details of the illustrated construction may be made without departing from the spirit of the invention.

We claim:

1. A method of recovering kaolin clay from raw ore having a silica sand content in quantities that inhibit air separation of the silica sand from the kaolin clay comprising the steps of:
   a. preparing a slurry of the ore;
   b. moving the ore slurry to reduce the particle size of the kaolin clay to substantially the normal particle size present in the raw ore;
   c. separating the silica sand from the kaolin clay slurry; and
   d. drying the kaolin clay slurry wherein the drying atmosphere temperature is not greater than approximately 1,100°F. and the exposure time of the kaolin clay slurry in such heated atmosphere is not longer than approximately 30 seconds.

2. A method of recovering kaolin clay from raw ore having a silica sand content in quantities that inhibit air separation of the silica sand from the kaolin clay comprising the steps of:
   a. preparing a slurry of the ore;
   b. moving the ore slurry to reduce the particle size of the kaolin clay to substantially the normal particle size present in the raw ore;
   c. separating the silica sand from the kaolin clay slurry; and
   d. drying the kaolin clay slurry wherein the drying atmosphere temperature is not greater than approximately 500°F. and the exposure time of the kaolin clay slurry in such heated atmosphere is not longer than approximately 20 minutes.

3. A method of recovering kaolin clay from raw ore having a silica sand content in quantities that inhibit air separation of the silica sand from the kaolin clay comprising the steps of:
 a. preparing a slurry of the ore;
 b. moving the ore slurry to reduce the particle size of the kaolin clay to substantially the normal particle size present in the raw ore;
 c. separating the silica sand from the kaolin clay slurry; and
 d. spraying the kaolin clay slurry into a rotary kiln drier.

* * * * *